United States Patent [19]

Fukutani et al.

[11] Patent Number: 5,132,830
[45] Date of Patent: Jul. 21, 1992

[54] COLOR LIQUID CRYSTAL DISPLAY DEVICE HAVING A LIGHT SCATTERING PLATE AND LIGHT BLOCKING MEMBERS

[75] Inventors: Hiroshi Fukutani, Nara; Kunihiko Ito, Yamatokooriyama; Kazuhiko Akimoto, Nara, all of Japan

[73] Assignee: Sharp Kabushiki Kaisha, Osaka, Japan

[21] Appl. No.: 630,039

[22] Filed: Dec. 19, 1990

[30] Foreign Application Priority Data

Sep. 7, 1990 [JP] Japan .................................. 2-237840

[51] Int. Cl.⁵ .......................................... G02F 1/1335
[52] U.S. Cl. .......................................... 359/67; 359/69; 359/68
[58] Field of Search ............... 350/339 D; 359/69 US, 359/67 US, 68 US

[56] References Cited

U.S. PATENT DOCUMENTS

| | | | |
|---|---|---|---|
| 4,171,874 | 10/1979 | Bigelow et al. | 359/69 X |
| 4,239,349 | 12/1980 | Scheffer | 359/69 X |
| 4,721,366 | 1/1988 | Nosker | 359/69 X |
| 4,874,227 | 10/1989 | Matsukawa | 359/67 |

Primary Examiner—Stanley D. Miller
Assistant Examiner—Ron Trice
Attorney, Agent, or Firm—David G. Conlin; Donald R. Castle

[57] ABSTRACT

In a color liquid crystal display device of the invention, light-blocking members of predetermined configurations (characters, graphics etc.) are disposed on the surface of one side of a liquid crystal display element, that is to say the surface on the side opposite to the light source, and the predetermined configurations are displayed on the color liquid crystal display device by blocking the light from the light source with the light-blocking members. Further, a light-scattering plate is disposed between the light source and the liquid crystal display element, or between the liquid crystal display element and the light-blocking members. It is possible to allow transmission of a part of the light blocked by the light-blocking members by scattering the light which is transmitted through the liquid crystal display element with the arrangement of the light-scattering plate. Therefore, around the periphery of the light-blocking members, the color balance of the transmitted light breaks down and only a specific color of light is transmitted, thereby preventing the colored and blurred appearance of the peripheral part of the light-blocking members. Based upon this, the display quality of the color liquid crystal display device is markedly improved.

1 Claim, 5 Drawing Sheets

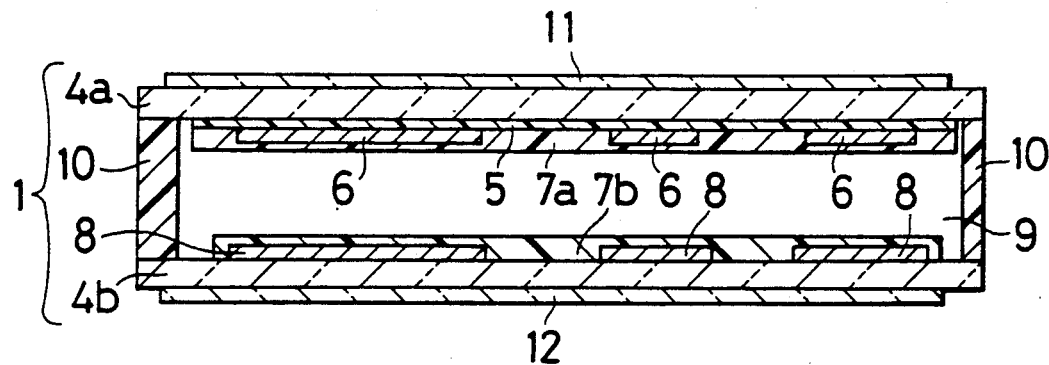
Fig. 2 Prior Art
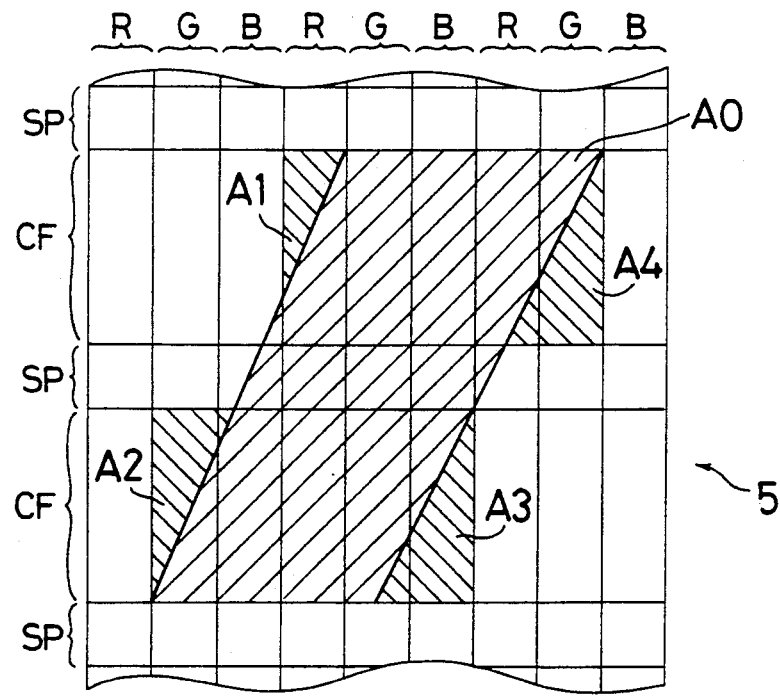

COLOR LIQUID CRYSTAL DISPLAY DEVICE HAVING A LIGHT SCATTERING PLATE AND LIGHT BLOCKING MEMBERS

BACKGROUND OF THE INVENTION

1. Field of the Invention

The present invention relates to a segment type color liquid crystal display device which displays predetermined characters and graphics etc. in color.

2. Description of the Prior Art

FIG. 1 is a cross sectional diagram of the prior art segment type color liquid crystal display device 1. A color filter 5 is provided by a printing process or an electrodeposition color process etc. across nearly the entire surface of one side of the transparent substrate 4a, and a plurality of segment electrodes 6 are formed on predetermined display areas of the color filter 5. As shown in FIG. 2, the color filter 5 is composed of red filters R, green filters G, and blue filters B, each of which are formed in narrow strips. The filters R, G, and B are each formed in the areas CF, and for example, black light-blocking layers are formed in the areas SP.

The segment electrodes 6 are composed of electrodes for red, electrodes for green, and electrodes for blue, which correspond to the red filters R, green filters G, and blue filters B respectively. An orientation film 7a is formed on the surface of the transparent substrate 4a where the color filter 5 and the segment electrodes 6 are formed.

A plurality of common electrodes 8 are formed on the surface of one side of the transparent substrate 4b, across the areas which include the segment electrodes 6, and further, an orientation film 7b is formed on that surface. The transparent substrates 4a and 4b are arranged so that the surface on which the respective orientation films 7a and 7b are formed face each other. A twisted nematic liquid crystal layer 9 is sandwiched between the transparent substrates 4a and 4b, and is sealed with a sealant 10. Further, the polarizer plates 11 and 12 are provided on the surfaces of the transparent substrates 4a and 4b respectively which are on the sides opposite from the liquid crystal layer 9.

Here, the polarizer plates 11 and 12 are arranged so as to achieve parallel polarization, and when voltage is not applied, light is allowed to pass through the color liquid crystal display device 1, performing so-called normally white display. Normally white display is a display method wherein the background is for example white in color, and which displays the desired configuration by applying voltage to the liquid crystal layer 9 corresponding to the configuration to be displayed, thereby changing the light distribution state of the molecules in the liquid crystal and blocking the light. In the color liquid crystal display device 1, color filter 5 is formed by the minute rectangular shaped filters R, G, and B as shown in FIG. 2, and the transmitted light turns white due to the mixing of red light, green light, and blue light. In other words, when voltage is not applied, white is displayed as the background color in the color liquid crystal display device 1. Therefore, in case for example, voltage is applied only to the electrodes for blue which make up the segment electrodes 6, the blue light is blocked and yellow is displayed due to the mixing of red light and green light.

When the above mentioned color liquid crystal display device 1 is used in audio devices, OA (Office Automation) devices, or home electrical products, there are cases where a transparent film preprinted with numbers, characters and graphics etc. is arranged on the front of the color liquid crystal display device 1. For example, when using the color liquid crystal display device 1 as a level meter for a cassette tape recorder, characters and graphics such as the characters "R" and "L" indicating the left and right channels, and the numbers indicating the recording playback level, which need not be displayed using the color liquid crystal display device 1, that is to say the characters and graphics etc. which may always be in a visible state, are printed on a transparent film and arranged on the front of the color liquid crystal display device 1.

Then, when the characters etc. printed on the transparent filter were small, the periphery of the characters appeared blurred and sometimes difficult to distinguish, because the color filter 5 as mentioned above, was composed of a plurality of filters formed in minute rectangular shapes arranged, for example, in a matrix, and hence there was a limit on the size of the characters.

For example in FIG. 2, let us imagine a case where part of a character is arranged in area AO. The color filter 5 has the 3 types of color filter R, G and B as 1 unit area, and in this 1 unit area, white color is obtained by the mixing of the transmitted light. However, in area A1 only red light is transmitted, and sometimes area AO which is close to area A1 appears to be colored red and blurred. Further, in areas A2 and A4 green light is transmitted, and sometimes areas AO which is close to areas A2 and A4 appears to be colored green and blurred. Still further, in area A3 only blue light is transmitted, and sometimes area Ao which is close to area A3 appears to be colored blue and blurred. That is to say, the phenomenon in which the periphery of a character appears blurred occurs because the color balance of the transmitted light breaks down.

SUMMARY OF THE INVENTION

The object of the invention is to solve the above mentioned problem and to provide a color liquid crystal display device with markedly improved display quality.

The invention is a color liquid crystal display device comprising a liquid crystal display element having a pair of light-transmissive substrates with a liquid crystal layer sandwiched between them, a plurality of color selection members provided across nearly the entire surface of the side of the light-transmissive substrates facing the liquid crystal layer which select one color for the transmitted light from among a plurality of predetermined colors, light-transmissive display electrodes provided on the surfaces of the side of the light-transmissive substrates facing the liquid crystal layer, formed corresponding to each of the plurality of color selection members within the predetermined display areas;

light-blocking members of predetermined configurations disposed on the surface of one side of the liquid crystal display element;

a light source disposed on the side opposite from the light-blocking members of the liquid crystal display element; and a light-scattering plate disposed between the light source and the light-blocking members.

In accordance with the invention, when voltage is not applied to the liquid crystal layer by the display electrodes, so-called normally white display can be performed by allowing the light from the light source to be transmitted through the liquid crystal display element. Here, for example by making the colors selected by the color selection members red, green and blue respectively, white is displayed as the background color in the liquid crystal display element through the mixing of red light, green light and blue light. Here, by applying voltage to the display electrodes formed corresponding to each of the plurality of color selection members within the predetermined display areas, the transmission of light is blocked in the areas corresponding to the display electrodes to which voltage has been applied, and therefore a specific color is displayed in the display areas. For example, red is displayed in the display areas by blocking green light and blue light, and by blocking the red light, greenish blue (cyan) is displayed in the display areas through the mixing of green light and blue light.

In the color liquid crystal display device of the invention, light-blocking members of predetermined configurations (characters, graphics etc.) are disposed on the surface of one side of the liquid crystal display element, that is to say the surface on the side opposite to the light source, and the predetermined configurations are displayed on the color liquid crystal display device by blocking the light from the light source with the light-blocking members.

Further, the light-scattering plate is disposed between the light source and the liquid crystal display element, or between the liquid crystal display element and the light-blocking members. The light from the light source can be scattered by this light-scattering plate. Therefore, around the periphery of the light-blocking members, the light which was originally supposed to be blocked by the light-blocking member comes to be transmitted. Because of this, around the periphery of the light-blocking members, the color balance of the transmitted light breaks down and only a specific color of light is transmitted, thereby preventing the colored and blurred appearance of the peripheral part of the light-blocking members. Based upon this, the display quality of the color liquid crystal display device is markedly improved.

As described above based upon the invention, it is possible to allow transmission of a part of the light blocked by the light-blocking members by scattering the light which is transmitted through the liquid crystal display element with the arrangement of the light-scatterring plate. Based upon this, it is possible to prevent the break down of color balance in the light transmitted through liquid crystal display element 23 due to the arrangement of the light-blocking members. Therefore, even in the case of providing minute light-blocking members, in other words even when light-blocking members are established which are of a size close to the size of the color selection members provided in the liquid crystal display element, blurring around the periphery of the light-blocking members is prevented and it is possible to read the light-blocking members (characters) clearly. Based upon this, it is possible to markedly improve the display quality of the color liquid crystal display device.

BRIEF DESCRIPTION OF THE DRAWINGS

Other and further objects, features, and advantages of the invention will be more explicit from the following detailed description taken with reference to the drawings wherein:

FIG. 1 is a cross-sectional diagram showing the construction of the color liquid crystal display device 1 of the prior art;

FIG. 2 is an enlarged plane view of the color filter 5 which is formed in the color liquid crystal display device 1 of the prior art;

DETAILED DESCRIPTION OF THE PREFERRED EMBODIMENTS

Figure 3:
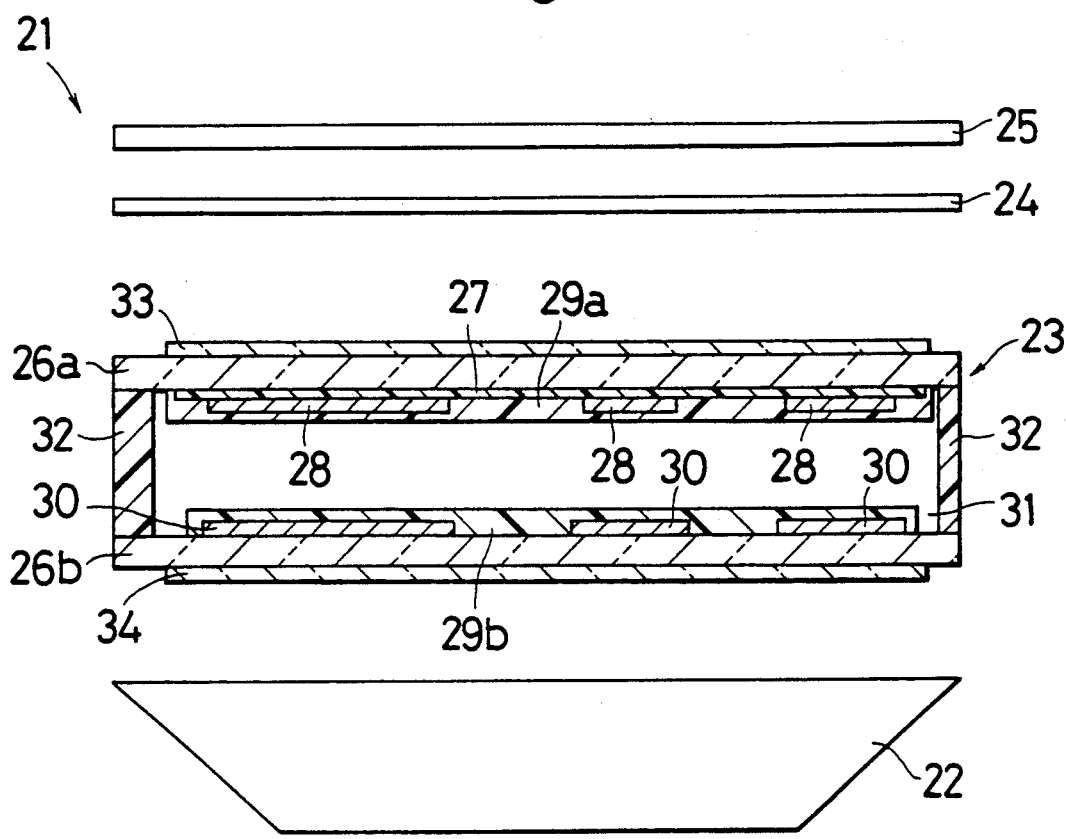
FIG. 3 is a cross-sectional diagram of the color liquid crystal display device 21, which is one embodiment of the invention.

Now referring to the drawings, preferred embodiments of the invention are described below.

FIG. 3 is a cross-sectional diagram showing the construction of the color liquid crystal display device 21, which is one embodiment of the invention. The color liquid crystal display device 21 is composed of the back light 22, the liquid crystal display element 23, the light-scattering plate 24 and the transparent substrate 25 stacked in this order. The back light 22 is for example composed of a hot cathode tube etc. The characters and numbers etc. to be discussed later are printed on the transparent substrate 25.

The liquid crystal display element 23 has a pair of transparent substrates 26a and 26b which are made of glass or plastics etc., and the color filter 27 is formed across nearly the entire surface of one side of the transparent substrate 26a. The color filter 27 is, for example, composed of color filters of 3 colors formed in fine rectangular shapes, for instance a red filter R, a green filter G and a blue filter B, and the black light-blocking layers BL provided in the spaces between all of the filters, and is formed by a process such as a dyeing process, a printing process, an electrodeposition process or a pigment dispersion process. The segment electrodes 28 are formed on the color filter 27. The orientation film 29a is formed on the transparent substrate 26a, on which the color filter 27 and the segment electrodes 28 are formed.

The common electrodes 30 are formed on the surface of one side of the transparent substrate 26b, at least in the areas that include the segment electrodes 28, and further, the orientation film 29b is formed on that surface.

The transparent substrates 26a and 26b are arranged so that the surfaces on which the respective orientation films 29a and 29b are formed, face each other. The liquid crystal layer 31 is sandwiched between the transparent substrates 26a and 26b, and is sealed by the sealant 32. The polarizer plates 33 and 34 respectively are disposed on the surfaces of the substrates 26a and 26b which are opposite from the liquid crystal layer 31.

A polyamide resin for example is used in the orientation films 29a and 29b. The orientation films 29a and 29b are formed for example to a thickness of 600 Å, the orientation of the liquid crystal molecules is twisted by 90° between the transparent substrates 26a and 26b, and for example as in forming a levorotatory liquid crystal layer, it undergoes a rubbing process with nylon fabric.

In order to maintain a uniform space between the transparent substrates 26a and 26b, plastic spacers, not illustrated, are put between these substrates. The space between the substrates is for example established at 5 micron by these spacers. Epoxy resin for example is used as the sealant 32 for sealing the liquid crystal layer 31. A phenyl cyclohexane compound liquid crystal, for example, is chosen for the liquid crystal layer 31. Furthermore, cholesteric nonanoate is added to this liquid crystal layer, to make it levorotatory.

Further, the orientation films 29a and 29b may also undergo rubbing treatment that will twist the direction of orientation of the liquid crystal molecules between the crystal layer dextrorotatory. In this case, a phenyl cyclohexane compound liquid crystal with CB-15 (made by the Merck Co.) added, is used as a dextrorotatory chiral material in the liquid crystal layer 31.

Figure 4:
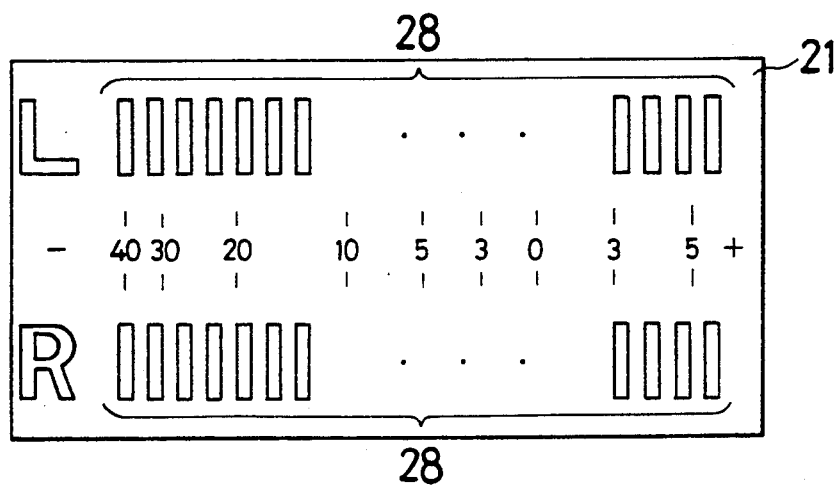
FIG. 4 is an enlarged plane view of the color liquid crystal display device 21.

FIG. 4 is a plane view of the color liquid crystal display device 21. In this embodiment, the case of using the color liquid crystal display device 21 as a level meter provided in a cassette tape recorder or other audio device is explained. A plurality of rectangular areas and a plurality of display characters are set up on the color liquid crystal display device 21. The segment electrodes 28, which are formed corresponding to the rectangular areas, are arranged in the plurality of rectangular areas. The plurality of display characters, for example the Roman letters "L" and "R", the numerals "40", "30", "20", "10", "5", "3" and "0", and the symbols "−", "+", and "|" are formed by printing or pasting etc. onto the surface of the transparent substrate 25, the light-blocking members which are formed in configurations corresponding to the respective characters.

Figure 5:
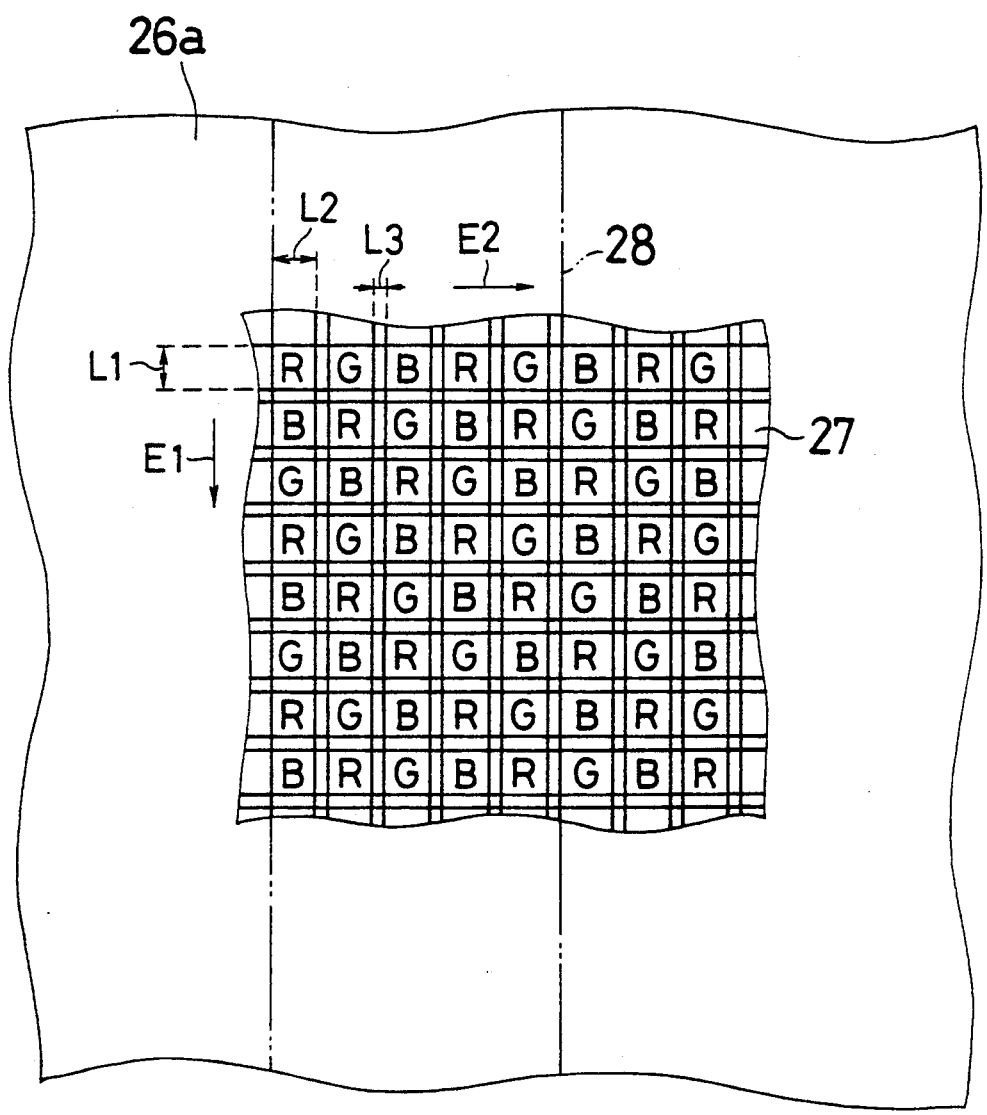
FIG. 5 is an enlarged plane view diagram of the color filter 27.
Figure 6:
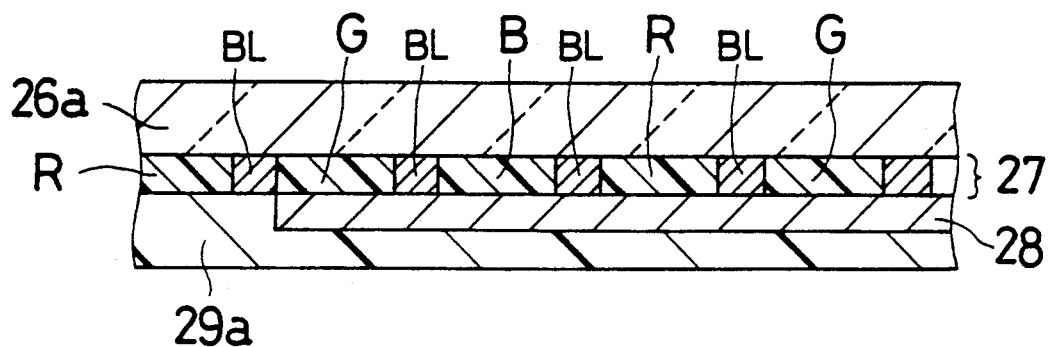
FIG. 6 is an enlarged cross-sectional diagram of the area around the color filter 27.

FIG. 5 is an enlarged plane view of the color filter 27, and FIG. 6 is an enlarged cross-sectional diagram of the area around the color filter 27. In the color liquid crystal display device 21, the color filter 27, which is comprised of color selection members, is provided across nearly the entire surface of the transparent substrate 26a. The color filter 27 is formed by disposing all of the filters R, G and B, for red, green and blue in a matrix form or mosaic form. In FIGS. 5 and 6, red filters are indicated by the reference symbol R, green filters are indicated by the reference symbol G, and blue filters are indicated by the reference symbol B. The size of the filters R, G and B is minute, and of a size indistinguishable by the naked eye.

As an example, rectangular shaped filters R, G and B are used where the length L1=330 micron and the width L2=80 micron, and 30 micron is selected for the space L3 between all of the filters. Therefore, the area formed by a row of 3 of the filters type R, G and B in the direction of their width E2, is a square of 330 micron×330 micron.

The space L3 between the filters is determined by the manufacturing precision of the color filter by a photo process etc., and it is generally from 15 micron to 40 micron.

Regarding the disposition of the filters, for example the arrangement R-G-B is repeated in the direction of the width of the filters E2, and the arrangement R-B-G is repeated in the direction of the length of the filters E1. The shape of the filters R, G and B may be made square or another shape.

Further, the black light-blocking layer BL is formed between all of the filters R, G and B. The light-blocking layer BL is formed with chrome (Cr) or black pigment etc.

Figure 7:
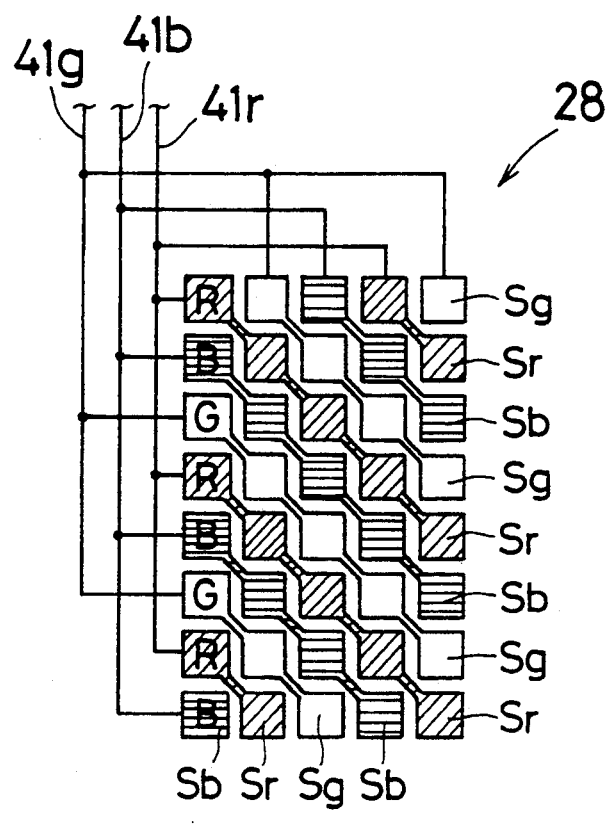
FIG. 7 is an enlarged plane view of a segment electrode 28.

FIG. 7 is an enlarged plane view of a segment electrode 28. As mentioned above the quadrilateral color filters R, G and B, for the 3 colors red, green and blue, are disposed in a plurality of matrix forms or mosaic forms on the transparent substrate 26a, and the invention is the color liquid crystal display device 21 which has transparent electrodes set up as the signal lines, so as to connect in sequence the segment electrodes corresponding to the color filters of the same color.

The segment electrode 28 is made up of electrodes Sr for red, electrodes Sg for green and electrodes Sb for blue. The electrodes Sr, Sg and Sb are formed in the areas that correspond to the filters R, G and B respectively, and each of the electrodes Sr, Sg and Sb respectively are connected by the transparent electrodes 41r, 41g and 41b which serve as signal lines. Using this connection method, it is possible to display the 7 colors red, yellow, green, greenish blue (cyan), Blue, white, and pink (magenta) in the desired display areas, by freely selecting the segment electrodes to which voltage is applied.

Figure 8:
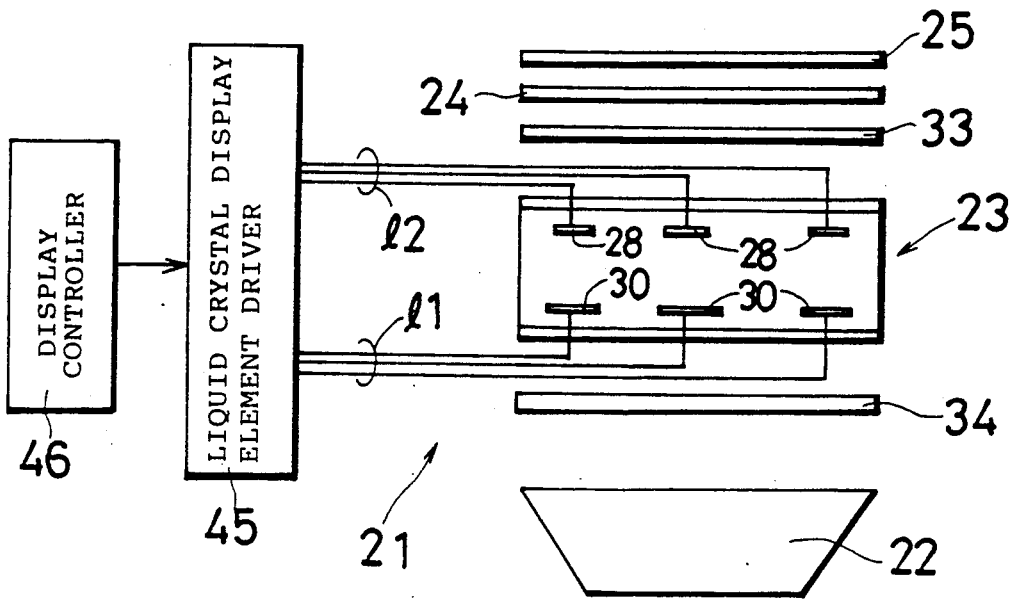
FIG. 8 is a block diagram showing the electrical construction of the color liquid crystal display device 21.

FIG. 8 is a block diagram showing the electrical construction of the color liquid crystal display device 21. The back light 22 is disposed on the side of the polarizer plate 34 that is opposite from the liquid crystal display element 23 , and a plurality of colors, as mentioned later, are displayed on the color liquid crystal display device 21 by transmitting/blocking the light from the back light 22 using the liquid crystal display element 23. The liquid crystal element is controlled by the liquid crystal element driver 45. The liquid crystal element driver 45 applies voltage to the common electrodes 30 through the signal lines 11 based upon the display control signals from the display controller 46, and applies voltage to the selected segment electrodes 28 through the signal line group 12. By this means, color display can be performed on the color liquid crystal display device 21.

The case of performing so-called normally white display on the above mentioned color liquid crystal display device 21 will now be explained. Here, as to the liquid crystal molecules of the liquid crystal layer 31, the molecules which are closest to the transparent substrate 26b are in a state or orientation which is perpendicular to the surface of the paper in FIG. 3, as the transparent substrate 26a is approached they gradually twist toward the right, and the liquid crystal molecules that are closest to the transparent substrate 26a are in a state of orientation which is parallel to the surface of the paper in FIG. 3.

Normally white display is a display method which displays the desired configurations by allowing light to be transmitted through the liquid crystal layer 31 when voltage is not being applied, with a white background for example, and where light is blocked by changing the orientation state of the liquid crystal molecules with the application of voltage to the liquid crystal layer 31 in the areas that correspond to the configurations to be displayed. Therefore, in order that the polarizing direction of the polarizer plates 33 and 34 will achieve parallel polarization, they are disposed for example, so that the polarizing direction of the polarizer plate 34 is in the direction perpendicular to the surface of the paper in FIG. 3, and the polarizing direction of the polarizer plate 33 is in a direction parallel to the surface of the paper in FIG. 3. By this means, the light which is transmitted through the polarizer plate 34 is twisted 90° by the liquid crystal layer 31, and it can be transmitted through the polarizer plate 33. Then, the color filter 27 is formed by the fine rectangular filters R, G and B as shown in the above mentioned FIG. 5, and the transmitted light becomes white light through the mixing of red light, green light and blue light. In other words, white is displayed as the background color in the color liquid crystal display device 21 when voltage is not applied.

The liquid crystal molecules of the liquid crystal layer 31 to which voltage is applied orient themselves in the direction of the electric field. Therefore, the linearly polarized light transmitted through the polarizer plate 34 in the direction perpendicular to the surface of the paper in FIG. 3 is transmitted through the liquid crystal layer 31 in nearly the same state of polarization. Here, the light which was transmitted through the liquid crystal layer 31 cannot be transmitted through the polarizer plate 33, because the polarizing direction of the polarizer plate 33 is in the direction parallel to the surface of the paper in FIG. 3.

The liquid crystal layer 31 operates as a light shutter based on the operation of voltage (ON) and the non-operation of voltage (OFF). The relationship among the ON/OFF state of the segment electrodes, the operation of the liquid crystal layer as a light shutter, and the display color is shown in Table 1 below.

In Table 1, "o" indicates the open state of the light shutter, and "●" indicates the closed state of the light shutter.

TABLE 1

| Segment electrodes ON/OFF State | | | Light shutter | | | |
| --- | --- | --- | --- | --- | --- | --- |
| Sr | Sg | Sb | R | G | B | Display color |
| OFF | OFF | OFF | o | o | o | White |
| ON | OFF | OFF | ● | o | o | Greenish blue(Cyan) |
| OFF | ON | OFF | o | ● | o | Pink (Magenta) |
| OFF | OFF | ON | o | o | ● | Yellow |
| ON | ON | OFF | ● | ● | o | Blue |
| ON | OFF | ON | ● | o | ● | Green |
| OFF | ON | ON | o | ● | ● | Red |
| ON | ON | ON | ● | ● | ● | Black |

Figure 9:
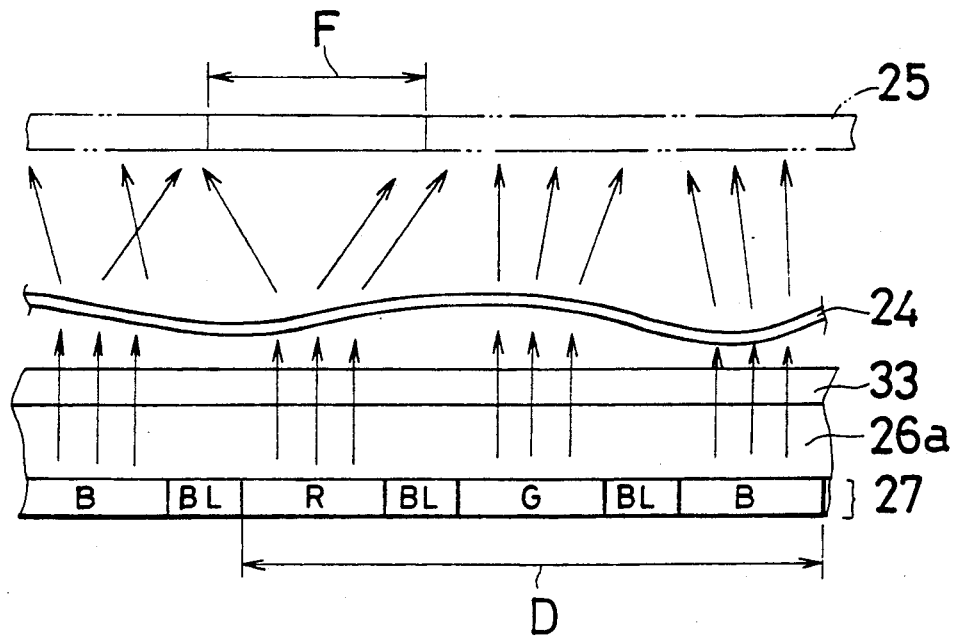
FIG. 9 is a diagram for explaining the effect of the light-scattering plate 24.

FIG. 9 is a diagram for explaining the effect of the light-scattering plate 24. The transmitted light, which has been transmitted through the filters R, G and B, is scattered by the light-scattering pate 24. By this means, even the light which was originally supplied to be blocked by the light-blocking area F can be transmitted through the transparent substrate 25. For example in the unit area D, even in a case where the area corresponding to a red filter R is blocked by the light-blocking area F, and the color balance of the transmitted light breaks down, a part of the red light transmitted through the red filter R is transmitted through the transparent substrate 25. By this means it is possible to maintain the color balance in the unit area D.

By means of this embodiment as mentioned above, it is possible to transmit part of the light which is blocked by the light-blocking area F, by scattering the light transmitted through the liquid crystal display element 23 with the arrangement of the light-scattering plate 24. Based upon this, it is possible to prevent break down of the color balance due to the light-blocking area F. Therefore, the blurring of characters is prevented and it becomes possible to read the characters clearly when the light-blocking area F is a very small area, in other words even when small characters are set up on the transparent substrate 25 (characters of a size close to the size of the filters). Based upon this, it is possible to markedly improve the display quality of the color liquid crystal display device 21.

In this embodiment, the light-scattering plate 24 was provided between the liquid crystal display element 23 and the transparent substrate 25, however, it may also be provided between the back light 22 and the liquid crystal display element 23. Further, it is also possible to roughen the surfaces of the transparent substrates 26a and 26b on which the polarizer plates 33 and 34 respectively are provided, instead of providing the light-scattering plate 24.

In this embodiment, twisted nematic liquid crystal, wherein the liquid crystal molecules are twisted by an angle of 90°, was used as the liquid crystal layer 31, however, super twisted nematic liquid crystal, with a twisted angle of 180° to 270°, may also be used.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and the range of equivalency of the claims are therefore intended to be embraced therein.

What is claimed is:

1. A color liquid crystal display device comprising, in sequential order, a light source, a liquid crystal display element, a light scattering plate, and a transparent substrate containing light-blocking members, said liquid display element having a pair of light-transmissive substrates with a liquid crystal layer sandwiched between said substrates, a plurality of color selection members provided across nearly the entire surface of the sides of the light-transmissive substrates facing the liquid crystal layer which select one color for the transmitted light from among a plurality of predetermined colors, and light-transmissive display electrodes provided on the surfaces of the sides of the light-transmissive substrates facing the liquid crystal layer and formed corresponding to each of the plurality of color selection members;

light-blocking members of predetermined configurations disposed on the surface of one side of the transparent substrate;

the light source disposed on the side of the device opposite from the light-blocking members and the light scattering plate; and the light-scattering plate disposed between the light source and the light-blocking members.

* * * * *